United States Patent [19]

McMurtry

[11] 4,153,998

[45] May 15, 1979

[54] PROBES

[75] Inventor: David R. McMurtry, Bristol, England

[73] Assignee: Rolls-Royce (1971) Limited, Bristol, England

[21] Appl. No.: 739,139

[22] Filed: Nov. 5, 1976

Related U.S. Application Data

[63] Continuation of Ser. No. 550,634, Feb. 18, 1975, abandoned, which is a continuation of Ser. No. 398,831, Sep. 19, 1973, abandoned.

[30] Foreign Application Priority Data

Sep. 21, 1972 [GB] United Kingdom ............... 43659/72
Jun. 14, 1973 [GB] United Kingdom ............... 28260/73
Aug. 3, 1973 [GB] United Kingdom ............... 37067/73

[51] Int. Cl.² ............................................. G01B 7/00
[52] U.S. Cl. ................................. 33/174 L; 33/172 E; 33/143 L

[58] Field of Search ............. 33/169 R, 172 E, 174 L, 33/174 P, 143 L, 174 Q

[56] References Cited

U.S. PATENT DOCUMENTS

| | | | |
|---|---|---|---|
| 3,216,118 | 11/1965 | Pistoles | 33/172 E |
| 3,277,248 | 10/1966 | Melvin, Jr. | 200/6 A |
| 3,307,006 | 2/1967 | Lawrence | 33/169 R |
| 3,557,462 | 1/1971 | Kiewicz et al. | 33/174 L |
| 3,855,708 | 12/1974 | Tann | 33/169 R |

Primary Examiner—Richard E. Aegerter
Assistant Examiner—Willis Little
Attorney, Agent, or Firm—Stevens, Davis, Miller & Mosher

[57] ABSTRACT

A probe for determining at what point in space contact is made between an object and a stylus. The stylus is located in an accurately defined rest position relative to a housing and slight deflection of the stylus away from this rest position is detected preferably by electrical switches.

17 Claims, 14 Drawing Figures

PROBES

This is a continuation of application Ser. No. 550,634 filed Feb. 18, 1975 which in turn is a continuation of application Ser. No. 398,831 filed Sept. 19, 1973, both now abandoned.

This invention relates to probes for use in measuring apparatus. In particular the invention relates to a probe for determining at what point in space contact is established between a stylus and an object. Such a probe can be supported on cross-slides for measuring in a rectangular cartesian framework.

A probe can be arranged to make or break an electrical circuit on contacting an object, and an indicator lamp provided to show the state of the circuit. Generally it is preferred that the probe breaks a circuit for then the indicator lamp is normally on when the probe is not in contact with the object and a malfunction in the probe is readily detected.

According to the present invention there is provided a probe comprising a stylus, a housing, means for urging the stylus towards a defined rest position relative to the housing, the stylus being capable of limited deflection away from said rest position to assume a different orientation relative to the housing and means for detecting said deflection.

In one preferred embodiment of the invention the stylus has three radially extending members substantially equally angularly disposed, the stylus being urged towards a defined rest position relative to the housing in which each member engages both sides of a respective Vee shaped slot so that said limited deflection of the stylus away from said rest position to assume a different orientation with respect to the housing results in at least one of said members breaking contact with at least one of said sides of one of said respective Vee shaped slots, there being provided means for detecting said deflection.

Preferably the means for detecting said limited deflection comprises an electrical circuit normally completed when the stylus is in its rest position, the circuit path passing in series from one Vee shaped slot to the next adjacent one and each member completing the circuit between the two sides of each respective Vee shaped slot.

In a further embodiment of the invention the stylus is urged into a rest position in contact with three distinct electrical contacts, the rest position being further defined by means of a coaxial circular portion of the stylus being urged into contact with two radially disposed ball bearings by a third spring loaded radially disposed ball bearing and by means for limiting the angular deflection of the stylus about its axis so that electrical contacting pads on the stylus corresponding to each of the three electrical contacts respectively remain in correspondence and wherein there is provided an electric circuit between the three contacts and their respective contacting pads on the stylus for detecting said limited deflection of the stylus away from the defined rest position.

In a yet further embodiment of the invention the stylus is urged into a rest position in contact with two axially disposed Vee shaped slots and has a curved end itself urged into engagement with an inclined surface so that said limited deflection of the stylus away from the rest position results in a change of orientation of the stylus relative to the housing thereby causing it to break contact with at least one of the sides of one of the Vee shaped slots and wherein there is provided means for detecting said deflection.

Embodiments of the invention will now be described by way of example only and with reference to the accompanying drawings wherein.

Figure 1:
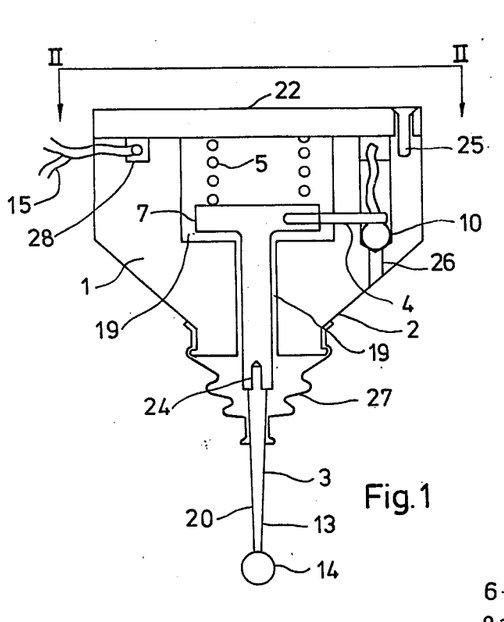
FIG. 1 is a longitudinal section through a probe constructed in accordance with the invention.
Figure 2:
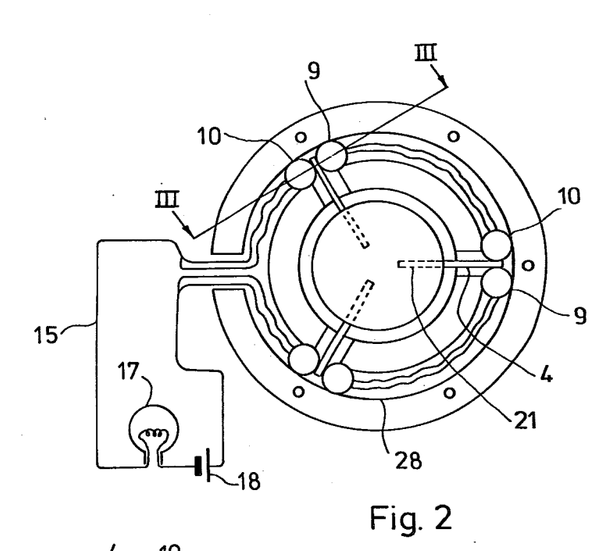
FIG. 2 is a view in the direction II—II of FIG. 1.
Figure 3:
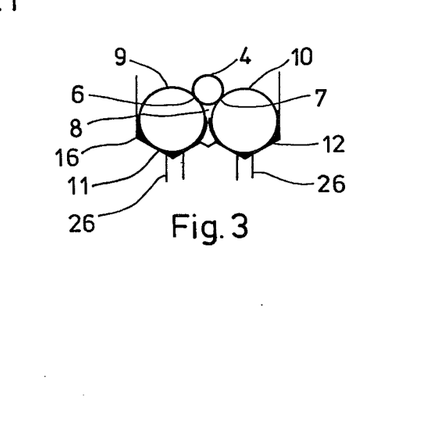
FIG. 3 is a section on the line III—III of FIG. 2

Referring now to FIGS. 1, 2, 3 a probe 1 comprises a housing 2 and a stylus 3. Three members, or elements 4 extend radially out from the stylus which is urged by means of a spring 5 acting on the top 3a of the stylus towards a defined rest position relative to the housing. In this defined rest position each member engages both sides 6 and 7 of a respective Vee shaped slot 8. The Vee shaped slots 8 are formed between a pair of ball bearings 9, 10 each sitting in a respective drilling 11, 12. That is, ball bearings 9,10 form convergent surfaces 6,7 which assure that the members 4 will be seated between the bearings such that in the rest position all three members 4 make contact substantially with their respective members 9,10.

The end 13 of the stylus which extends through the housing terminates in a ball 14, the position of whose geometrical center is accurately known.

In operation the probe is connected to a coordinate measuring framework (not shown) for example a rectangular cartesian or spherical polar coordinate framework and is movable in space in any direction to sense the boundaries of the object being measured. Contact between the ball 14 and the object deflects the stylus away from its rest position against the force of the spring 5.

The stylus thus assumes a different orientation relative to the housing while deflected.

The deflection is detected by providing an electric circuit 15 which is normally completed when the stylus is in its rest position. Each ball bearing is electrically insulated from the housing and from the other ball in the pair by means of insulation 16. The circuit path passes in series from one Vee shaped slot 8 to the next adjacent one and each member, which is insulated from the stylus and the other members, completes the circuit between the two sides of each respective Vee shaped slot. Deflection of the stylus away from its defined rest position results in at least one of the members breaking contact with at least one of said sides of one of said respective Vee shaped slots thus breaking the circuit 15 and extinguishing the indicator lamp 17, which is usually lit by the power supply 18.

The breaking of the circuit is used to provide an input pulse to an automatic switching arrangement, not shown but well understood per se, and which may be used as an instruction to a device to read and record the coordinates of the probe at that time. It has been found that a pulse of one microsecond duration enables a measurement to be made with great accuracy.

A clearance 19 is provided between the stylus and the housing and this allows limited deflection of the stylus within the housing. Any deflection of the stylus away from the defined rest position is resiliently opposed by compression of the spring 5; thus damage to the stylus due to the inertia of the probe during measurement may be avoided. If inertia of the probe is a problem, for example it may prove difficult to prevent bending the shaft 20 of the stylus after a reading has been taken, this can be overcome by providing a known kind of break mechanism into the stylus.

In setting up the probe it is necessary to ensure that each member makes good contact with each of its respective pair of ball bearings. This can readily be done by insulating the part 21 of each member that fits into the stylus and coating it with glue; the probe is then assembled and a cover plate 22 which acts as a retainer for the spring 5 is attached by set screws 25. When the glue has set and the circuitry is connected to the power supply, lighting of the indicator lamp indicates that the three switches are all made. In this manner the manufacturing tolerances associated with the depth of the drillings 9, 10 in which each ball bearing is placed are rendered harmless. To ensure that the geometric center of the ball 14 is in the desired place relative to the probe, provision can be made for attaching the ball and its associated shaft 20 to the stylus after the geometry of the members has been fixed.

The shaft 20 of the stylus is fitted by means of a spigot 24 on the shaft engaging a counterbore. The center of the ball 14 can be aligned with the housing by making the spigot 24 a loose fit in the counterbore in the stylus and gluing them together while the probe and ball 14 are held in an assembly jig.

The drillings for the ball bearings are continued through the housing at a diameter 26 less than that of each ball bearing so that during assembly a faulty ball bearing can be readily removed and replaced.

The shaft of the stylus as illustrated in FIG. 1 is substantially co-axial with the detector but it will be appreciated that this is not necessary to the functioning of the device, for example during cylinder bore measurement it may be preferable for the ball and shaft to lie radially of the illustrated position.

It has been found that the performance of the probe is improved if it is filled with an electrically insulating oil. This prevents sparking at the contacts leading to deterioration thereof. The rubber gaiter 27 prevents the escape of oil along the shaft and is sufficiently flexible so as not to interfere with the seating of the probe in its defined rest position.

The electrical connections between the Vee shaped slots may conveniently lie in an annular groove 28 in the housing. It will be appreciated that the use of ball bearings to form the Vee shaped slots is merely for convenience and that each pair could for instance be replaced with a pair of needle rollers inclined together.

Figure 4:
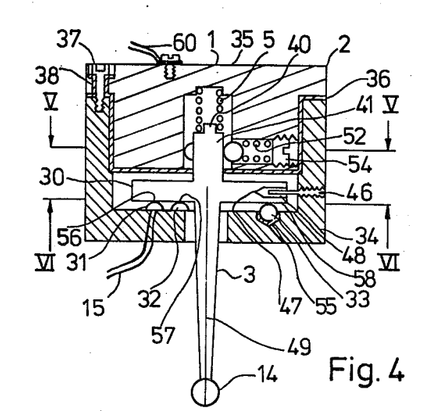
FIG. 4 is a longitudinal section through an alternative probe constructed in accordance with the invention.

In this embodiment it will be understood that the rest position of the stylus is both defined by and deflections from this rest post position detected by, the same means. In FIG. 4 an alternative embodiment is shown in which part of the task of defining the rest position of the stylus is achieved by means separate from the means for detecting deflection of the stylus away from this position.

Figure 5:
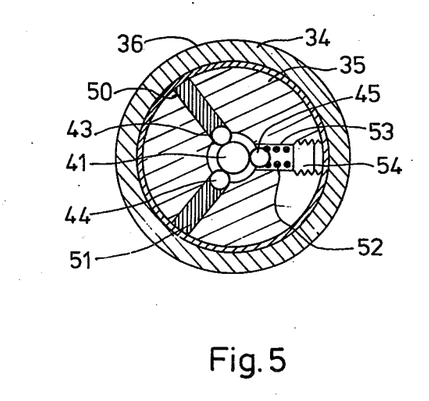
FIG. 5 is a cross-section of the probe of FIG. 4 on the line V—V.
Figure 6:
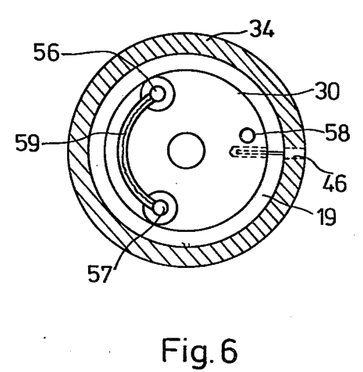
FIG. 6 is a cross-section of the probe of FIG. 4 on the line VI—VI.

Referring now to FIGS. 4, 5, and 6 there is shown a probe 1 comprising a stylus 3 which terminates at one end with a ball 14 and which has a first circular portion 30 which engages three electrical contact 31, 32, 33 disposed within the housing 2. The housing has a first part 34 and a second part 35 electrically insulated from the first part by a dielectric sleeve 36 having the shape of a top hat. The two parts of the housing are connected together by a plurality of bolts 37 each bolt being electrically insulated from the second part of the housing by insulator 38.

A coiled spring 5 lightly urges the first circular portion 30 of the stylus 3 into a rest position against the three electrical contacts 31, 32, 33. One end of the spring 5 is located in a recess in the second part of the housing and its other end engages a spigot 40 on a second circular portion 41 of the stylus 3 which is coaxial with the stylus. The rest position of the stylus is further defined by the second circular portion 41 being urged into contact with two radially disposed ball bearings 43, 44, a third spring loaded ball bearing 45 and also by a locking pin 46 which engages a bore 47 in the first circular portion 30, there being provided a clearance 48 between the bore 47 and the locking pin which limits the angular deflection of the stylus about its axis 49.

The two ball bearings 43, 44 are fixed in position by means of an epoxy resin glue introduced into each of the radial bores 50, 51 and the third ball bearing 45 is spring loaded by means of a coil spring 52 retained in the radial bore 53 by a threaded plug 54. The spring loaded ball may be restrained from falling out of the radially inner end of the bore 53 prior to assembly of the device by peening the end of the bore.

The three electrical contacts 31, 32, 33 chosen in this embodiment comprise three ball bearings substantially equally angularly disposed about the stylus and being affixed into and insulated from an annular groove 55 in the housing 2 by means of epoxy resin glue.

In operation contact between the ball 14 and an object deflects the stylus and in so doing moves the stylus relative to the housing and contact is broken between the stylus and at least one of the electrical contacts 31, 32, 33 which in the defined rest position of the stylus are in engagement with corresponding electrical contacting pads 56, 57, 58 on the stylus.

The breaking of one of the electrical contacts is sensed as before by a series electrical circuit.

In this embodiment the electric circuit passes via ball bearing 31 to electrical contacting pad 56, which is insulated from the stylus along a wire 59 attached to the stylus to electrical contacting pad 57 also insulated from the stylus to the second ball bearing 32 along a wire (not shown) within the annular groove in the housing to the third ball bearing 33 and out to a lead 60 via the electrical contacting pad 58, the stylus 3, the spring 5 and the first part of the housing 2. It will be appreciated that the locking pin 46 and the clearance 48 cooperate to maintain correspondence between the electrical contacts and electrical contacting pads while still allowing limited deflection of the stylus away from its defined rest position.

Figure 7:
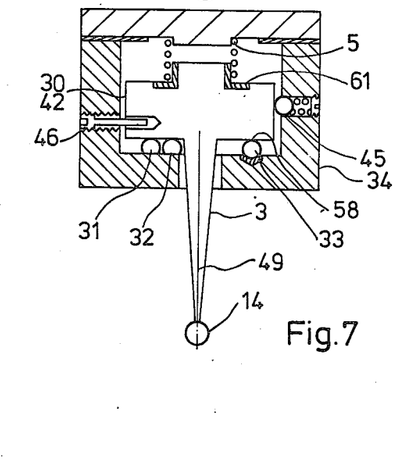
FIG. 7 is a longitudinal section through a probe similar to FIG. 4.

Referring now to FIG. 7 an alternative arrangement can be seen substantially similar to the previous embodiment but in which the first and second circular portions 30, 41 respectively are one and the same and the three ball bearings 31, 32, 33 for bearing on the circular portion are carried by the first part 34 of the housing.

In this embodiment it is necessary to insulate the third electrical contacting pad 58 from the stylus; this may readily be done as before by setting the contacting pad 58 in epoxy resin glue and connecting it by a wire (not shown) to the spring 5 which is isolated from the stylus by an insulating sleeve 61. This prevents shorting of the electrical circuit via the three ball bearings 43, 44, 45.

Figure 8:
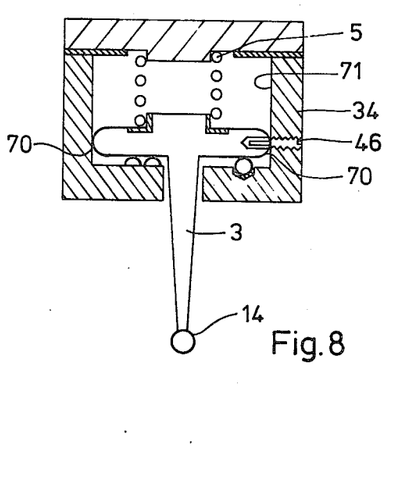
FIG. 8 is a longitudinal section through another probe.

In FIG. 8 can be seen another alternative embodiment in which the cylindrical portion of the stylus has a curved periphery 70 which is a close fit in a cylindrical bore 71 in the first part 34 of the housing; thus the stylus can deflect and move along the bore, being returned to its defined rest position under the influence of the spring 5.

In all of the embodiments described it is desirable that the underside three contacting pads of the stylus which contact the ball bearings 31, 32, 33, be ground perpendicular to the axis of the stylus. In this way the small angular movement of the stylus, permitted by the engagement of the locking pin 46 in the bore 47, does not change the relative positions of the center of the ball 14 and the housing 2 when the stylus is in its defined rest position.

It will be appreciated that in general wear on any of the surfaces of the stylus or ball bearings will not impair the operation of the probe. This is because such wear will only manifest itself by a change in the position of the center of the ball 14 relative to the probe. This positional change, providing it is constant during any particular set of measurements, is automatically taken care of when the profile of the object being measured is calculated from the points on its surface as determined from the coordinate measuring framework.

Figure 9:
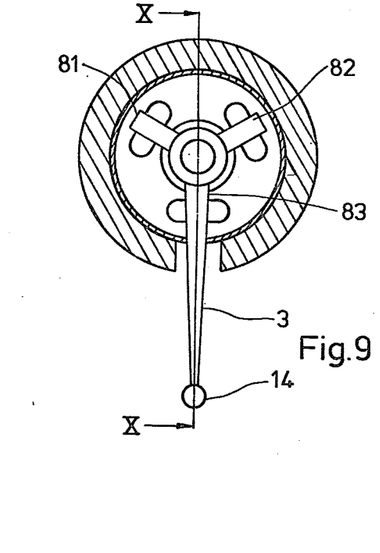
FIG. 9 is a section through a further probe.
Figure 10:
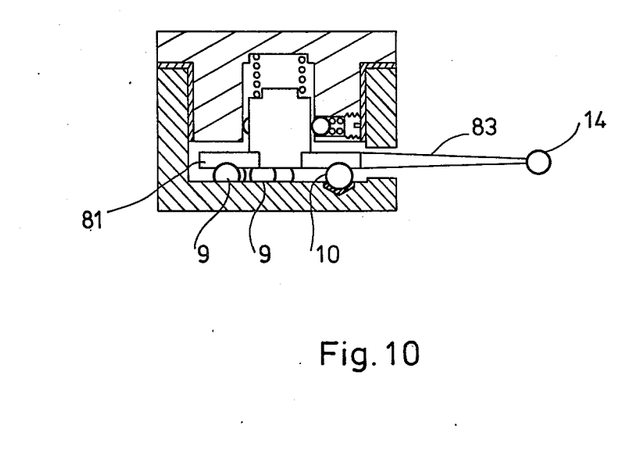
FIG. 10 is a section through the probe of FIG. 9 taken on the line X—X.

In FIGS. 9 and 10 another alternative embodiment of the invention is shown in which the stylus has three generally circular legs 81, 82 and 83 each of which cooperates with a Vee shaped slot formed as with reference to FIGS. 1, 2, and 3. One of the three legs 83 is extended and carries the ball 14 for taking measurements. This particular embodiment may have advantages in certain circumstances for example for the measuring of cylinder bores.

Figure 11:
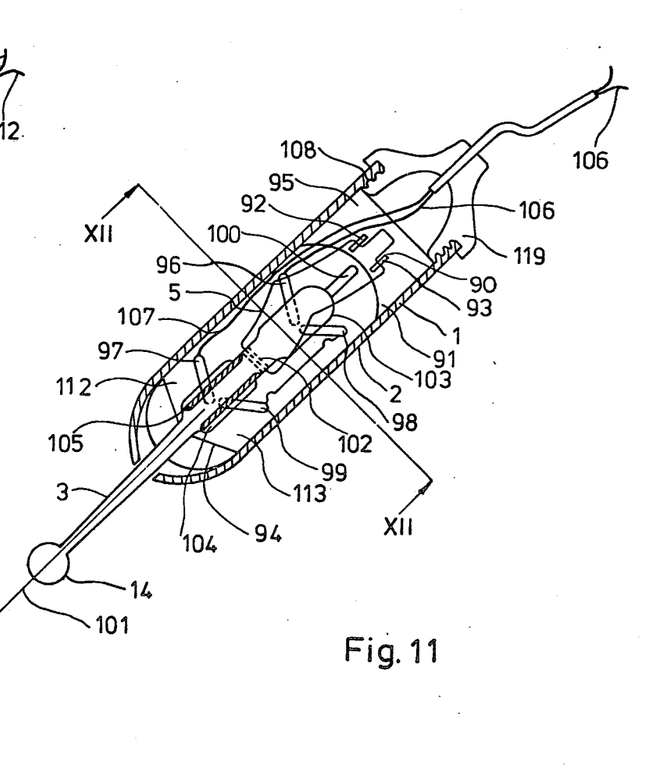
FIG. 11 is a section through a yet further probe constructed in accordance with the invention.
Figure 12:
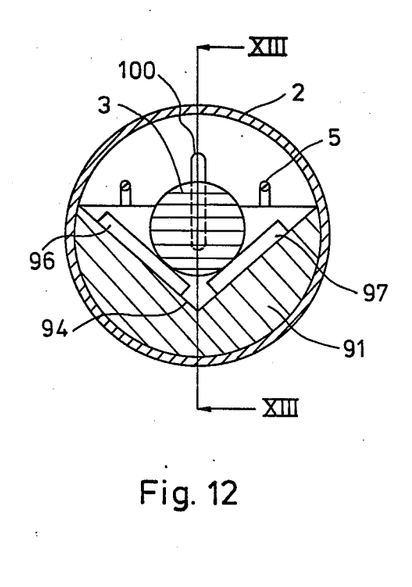
FIG. 12 is an enlarged section on the line XI—XI of FIG. 10.
Figure 13:
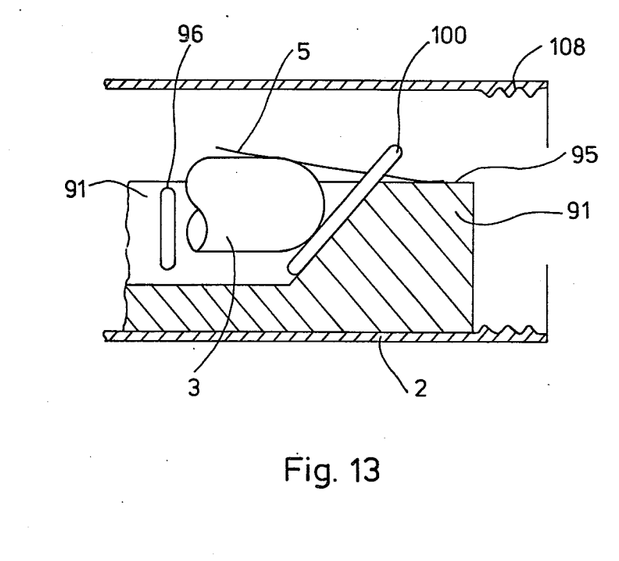
FIG. 13 is an enlarged view on the line XII—XII of FIG. 11.

Referring now to FIGS. 11, 12, 13 a probe 1 comprises a stylus 3 located within a housing 2. A hairpin spring 5 is secured at one end 90 to a dielectric body 91 by means of two straps 92 and 93 bonded into the dielectric body. The dielectric body further illustrated in FIGS. 11 and 12 is generally cylindrical with a "V" shaped groove 94 extending over most of its length and a platform portion 95 to which the straps 92 and 93 are bonded. The dielectric body which is made in a polyester resin is bonded with further polyester resin into the housing 2. Two pairs 96, 97 and 98, 99 of needle rollers are bonded to the sides 112, 113 respectively of the "V" shaped groove to form two "Vee" shaped slots and a fifth needle roller or surface 100 is bonded to the dielectric body so as to subtend an angle of about 45° with the axis 101 of the probe 1.

In operation the spring 5 which passes through a dimetral hole 102 in the stylus, urges the generally elongated cylindrical part of the stylus into contact with the two Vee shaped slots, and the curved end 103 into contact with the inclined surface of the needle roller 100 thus defining a rest position for the stylus. Contact between the ball 14 at the end of the stylus and an object to be measured deflects the stylus changing its orientation relative to the housing 2 and causing it to move away from at least one of the needle rollers. Thus by providing an electric circuit between the needle rollers and the stylus the movement of the stylus away from its rest position can be determined, each point of contact between the stylus and the needle rollers acting as a switch for making or breaking the electric circuit. All the five needle rollers are bonded to the dielectric body with polyester resin and are physically separated and hence electrically insulated from each other. The stylus has a cylindrical portion 104 insulated from the remainder of the stylus by a cylindrical sleeve 105 of polyester resin.

The electric circuit for determining when the stylus breaks contact with one of the needle rollers is connected from the wire 106 via the needle roller 96, the stylus 3, the needle roller 98, the needle roller 99, the cylindrical portion 104 of the stylus, the needle roller 97 and the wire 107 in series with a power supply and an indicating lamp (not shown).

The two wires 106 and 107 are mechanically supported relative to the probe by a rubber cap 119 which connects to the probe by a screw thread 108.

There is no need for an electrical connection to be made between the fifth needle roller 100 and the stylus as any axial movement of the stylus causes its spherical end or elements 103 to cooperate with the inclined needle roller 100 and thus break the electrical connection between one of the other needle rollers and the stylus.

It will be readily appreciated that although, in this embodiment, it is convenient to use needle rollers to define a pair of Vee shaped slots for locating the stylus in its rest position, other methods of location may be used. For example each needle roller could be replaced by a rectangular metallic strip. Needle rollers are preferred as they are readily commercially available and have a high standard of surface finish and hardness thus yielding low frictional forces to resist movement of the stylus and improving the sensitivity of the probe. The invention contemplates that any means of ensuring a definite rest position for the stylus may be substituted for the needle rollers and that the present point contact between the stylus and each needle roller may be replaced by a line contact.

In a modification (not shown) the fifth needle roller 100 is set perpendicular to the axis 101 of the probe thus restricting the measuring capability of the probe to two dimensions.

Figure 14:
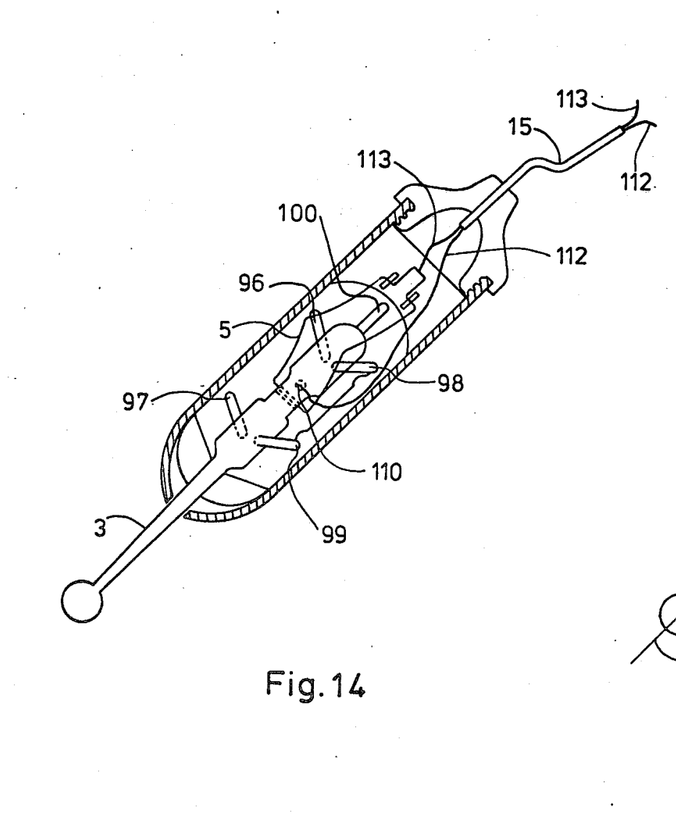
FIG. 14 is a longitudinal section through an alternative construction.

In an alternative embodiment illustrated in FIG. 14 the same disposition of needle rollers 96, 97, 98, 99, 100 is adopted as in FIG. 1 but their function, in combination with the spring 5 is purely to locate the stylus in its rest position. An electrical circuit 15, is then completed by way of the wire 112, the contact 110, the stylus 3, the hairpin spring 5 and the wire 113. Any deflection of the stylus away from its rest position will result in the switch formed between the stylus 3 and the contact 110 being broken and hence said deflection can be detected via the electrical circuit 15.

During mensuration of an object with any of the aforementioned embodiments a series of readings are taken at various positions about the object to produce information which may readily form the input data for a computer programmed to compare the object with a master object. Thus probes according to the invention may be used for measuring such objects as pipes for gas turbine engines and cylinder blocks fr internal combustion engines.

The probes herein described have been provided with a detector comprising an electrical switching system but it will be appreciated that the electrical switching system could be replaced by fluidic or other known switches and that the detector may comprise an optical projection system for magnifying a mismatch between two pointers, the mismatch providing an indication of movement of the stylus.

It will be further appreciated that any of the above embodiments may be filled with oil in a similar manner to that described with reference to FIGS. 1, 2, and 3.

We claim:

1. A probe comprising:
   (a) a stylus;
   (b) a housing for said stylus including abutment means defining a three-dimensional rest position for said stylus relative to said housing; said abutment means including a circular portion of said stylus, three ball bearings radially spaced apart about and engaging said circular portion, one of said ball bearings being spring loaded, and means for limiting angular deflection of said stylus about the axis of said stylus;
   (c) bias means for urging said stylus towards the rest position, said stylus being displaceable against said bias means and away from the rest position; and
   (d) means for detecting displacement of said stylus away from the rest position including three distinct electrical contacts within said housing, electrical contacting pads on said stylus, and an electrical circuit between said contacts and said pads, said bias means urging said pads into contact with said three electrical contacts, and said limiting means insuring correspondence between said pads and said contacts.

2. A device for mounting a stylus in position-determining apparatus wherein said device and an object are movable relative to each other for providing a signal when said stylus engages said object thereby indicating the position thereof, said device comprising:
   a fixed member,
   a movable member to which said stylus is connectable, said movable member being supportable on said fixed member at a plurality of spaced-apart locations, one of the movable and fixed members having at each of said locations a pair of mutually convergent surfaces and the other one of said members being engageable with said convergent surfaces,
   bias means for urging said movable member into contact with said fixed member so that all of said convergent surfaces are engaged thereby positively defining a rest position for said movable member, said movable member being removed from said rest position in opposition to said bias means when a force is applied to said stylus, said bias means and convergent surfaces co-operating, on cessation of said force, to return said movable member to said rest position, and
   means for providing said signal when said movable member is removed from its rest position.

3. A device according to claim 2 wherein said movable member comprises three connecting elements and a stylus holder to which said stylus is connectable, said connecting elements being in contact with all of said convergent surfaces when said movable member is in said rest position.

4. A device according to claim 3 wherein each said connecting element and each of said pair of convergent surfaces comprise electrical contacts, said device further comprising electrical circuit means changing state when, in consequence of movement of said movable member, contact between one said connecting element and a respective one of said convergent surfaces is broken, whereby movement of said movable member is detected.

5. A device according to claim 3 wherein said connecting elements are of cylindrical shape, and said mutually convergent surfaces are of spherical shape.

6. A device according to claim 2 wherein said movable member comprises a stylus holder to which said stylus is connectable and three arms radially extending from said stylus holder, and wherein said fixed member has three said pairs of convergent surfaces each of which supports one of said arms, said bias means urging said three arms into engagement with said three pairs of convergent surfaces, respectively.

7. A device according to claim 2 wherein said movable member comprises a stylus holder to which said stylus is connectable, said stylus holder having spaced-apart surfaces thereon, each of said stylus holder surfaces being in contact with a corresponding one of said convergent surfaces of said fixed member when said movable member is in said rest position.

8. A device according to claim 7 wherein said means for providing said signal includes a sensing element located adjacent at least one of said spaced-apart locations.

9. A device according to claim 7 wherein said movable member has cylindrical portions and said mutually convergent surfaces are cylindrical, the axis of each said cylindrical portion of said movable member extending perpendicular to the axes of a corresponding pair of said cylindrical convergent surfaces.

10. A device for mounting a stylus in position-determining apparatus wherein said device and an object are movable relative to each other for engaging the stylus with the object thereby to sense the position thereof, said device comprising:
    a fixed member having an axis,
    a movable member to which a stylus is connectable, said movable member being supportable on said fixed member at three spaced-apart locations arranged around said axis, at each of said locations one of the movable and fixed members having a pair of convergent surfaces and the other one of said members having a connecting element engageable with said convergent surfaces,
    bias means for urging said connecting elements into contact with said fixed member so that all of said convergent surfaces are engaged thereby positively defining a rest position for said movable member, said movable member being removed from said rest position in opposition to said bias means when a force is applied to said movable member in a direction transverse to said axis, said bias means, convergent surfaces and connecting elements co-operating, on cessation of said force, to return said movable member to said rest position, and
    means for providing said signal when said movable member is removed from its rest position.

11. A device according to claim 10 wherein each said connecting element and each said pair of convergent surfaces comprise electrical contacts, said device further comprising an electric circuit connected to said convergent surfaces, said circuit changing state when, in consequence of movement of said connecting element from between one of said convergent surfaces said electric circuit is broken.

12. A device for mounting a stylus in position-determining apparatus wherein said device and an object are movable relative to each other for engaging the stylus with the object and by such engagement sense the position thereof, said device comprising:
   a fixed member,
   a movable member to which a stylus is connectable, said movable member being supportable on said fixed member at two locations spaced-apart in a first direction, at each of said locations one of said movable and fixed members having a pair of surfaces convergent in a second direction transverse to said first direction and the other one of said members being engageable with all said surfaces to define a rest position for said movable member,
   bias means for urging said movable member into said rest position, said movable member being removable from said rest position in opposition to said bias means when a force is applied to said movable member, said bias means and said convergent surfaces co-operating, on cessation of said force, to return said movable member to said rest position.

13. A device according to claim 12 wherein at each of said locations said pairs of convergent surfaces constrain the movable member against movement in a third direction transverse to said first and second direction, and at one of said locations a further surface constrains said movable member against movement in said first direction.

14. A device for mounting a stylus in position-determining apparatus wherein said device and an object are movable relative to each other for providing a signal when said stylus engages said object thereby indicating the position thereof, said device comprising:
   a fixed member,
   a movable member to which said stylus is connectable, said movable member being supportable on said fixed member at a plurality of spaced-apart locations, one of the movable and fixed members having at each of said locations a pair of mutually convergent surfaces and the other one of said members being engageable with all said surfaces to define a rest position for said movable member,
   bias means for urging said movable member into said rest position, said movable member being removed from said rest position in opposition to said bias means when a force is applied to said stylus, said bias means and convergent surfaces cooperating, on cessation of said force, to return said movable member to said rest position, and
   means for providing said signal when said movable member is removed from its rest position.

15. A device for mounting a stylus in position-determining apparatus wherein said device and an object are movable relative to each other for engaging the stylus with the object and by such engagement sense the position thereof, said device comprising:
   a fixed member having an axis,
   a movable member to which a stylus is connectable,
   first electric contact elements connected to said fixed member at three locations spaced apart around said axis,
   second electric contact elements connected to said movable member in positions confronting said first elements in the direction of said axis,
   bias means for urging said movable member into engagement with said fixed member at all said first and second electric contact elements thereby positively defining a rest position for said movable member,
   means acting directly on said movable member for constraining said movable member against movement in a direction transverse to said axis when said movable member is in said rest position, said movable member being removable from said rest position in opposition to said bias means by a force applied to said movable member thereby to break engagement between said elements at at least one of said locations, said bias means and said constraining means cooperating to return said movable member to said rest position on cessation of said force, and
   an electric circuit connected to said contact elements to change state responsive to engagement between said elements at at least one of said locations being broken.

16. A device according to claim 15 wherein said directly acting means comprises an external cylindrical surface provided on one of said movable and fixed members and three support members provided on the other one of said movable and fixed members and grouped around said cylindrical surface, each said support member having a convex surface engaging said cylindrical surface, two of said support members being fixedly secured to said other one of said movable and fixed members, and spring means for urging the remaining one of said support members towards said two support members thereby establishing engagement between said cylindrical surface and said two of the support members.

17. A device according to claim 16 wherein said directly acting means comprises an internal cylindrical surface provided on one of said movable and fixed members, said other one of said movable and fixed members having a spherical surface in peripheral engagement with said internal cylindrical surface.

* * * * *

UNITED STATES PATENT AND TRADEMARK OFFICE
CERTIFICATE OF CORRECTION

PATENT NO. : 4,153,998
DATED : May 15, 1979
INVENTOR(S) : David R. McMURTRY

It is certified that error appears in the above-identified patent and that said Letters Patent is hereby corrected as shown below:

Column 10, Claim 17, line 53, change "16" to --15--.

Signed and Sealed this

First Day of January, 1991

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,153,998
DATED : May 15, 1979
INVENTOR(S) : David Robert McMURTRY

It is certified that error appears in the above-identified patent and that said Letters Patent is hereby corrected as shown below:

Col. 8, Claim 10, line 67, change "said" (first occurrence) to --a--.

Signed and Sealed this

Nineteenth Day of February, 1991

Attest:

HARRY F. MANBECK, JR.

*Attesting Officer*   *Commissioner of Patents and Trademarks*